(12) United States Patent
Tam

(10) Patent No.: US 12,415,291 B2
(45) Date of Patent: *Sep. 16, 2025

(54) METHODS FOR REPURPOSING USED CHOPSTICKS AND ARTICLES MADE FROM THE SAME

(71) Applicant: TRINITY INTERNATIONAL INDUSTRIES, L.L.C., Carson, CA (US)

(72) Inventor: Cze-Chao Tam, Carson, CA (US)

(73) Assignee: TRINITY INTERNATIONAL INDUSTRIES, L.L.C., Carson, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,356

(22) Filed: Aug. 20, 2024

(65) Prior Publication Data

US 2025/0144842 A1 May 8, 2025

Related U.S. Application Data

(63) Continuation of application No. 18/502,812, filed on Nov. 6, 2023.

(51) Int. Cl.
*B27M 1/02* (2006.01)
*A47G 21/06* (2006.01)
(Continued)

(52) U.S. Cl.
CPC ............ *B27M 1/02* (2013.01); *A47G 21/103* (2013.01); *B27G 11/00* (2013.01); *B32B 5/16* (2013.01); *B32B 21/02* (2013.01)

(58) Field of Classification Search
None
See application file for complete search history.

(56) References Cited

U.S. PATENT DOCUMENTS

| 5,955,023 A | * | 9/1999 | Ioffe | B27N 3/002 |
| | | | | 264/109 |
| 7,661,450 B2 | * | 2/2010 | Wang | E04F 15/04 |
| | | | | 144/380 |

(Continued)

FOREIGN PATENT DOCUMENTS

| CA | 1211913 A | * | 9/1986 |
| CN | 104029269 A | * | 9/2014 |

(Continued)

OTHER PUBLICATIONS

Fu, Y., & Zhu, J. "Green design and recycling systems for solving the dilemma of disposable chopsticks waste caused by online food delivery: A review." BioResources, 16(4), 8640. (Year: 2021).*

(Continued)

*Primary Examiner* — Vivian Chen
(74) *Attorney, Agent, or Firm* — INNOVATION CAPITAL LAW GROUP, LLP; Vic Lin

(57) ABSTRACT

Methods for repurposing used chopsticks can be utilized to make various wooden products therefrom. The wooden products can be made by sorting, stacking, pressing and finishing the product pressed product into a desired manufactured item. The method can include other steps, such as soaking, drying, polishing, and applying a finish. In some embodiments, the chopsticks, prior to pressing, may be modified by soaking, application of a finish or preservative, application of a binder, or the like. Such manufactured items can include furniture, houseware, storage products and the like.

12 Claims, 5 Drawing Sheets

(51) Int. Cl.
  *B27G 11/00* (2006.01)
  *B32B 5/16* (2006.01)
  *B32B 21/02* (2006.01)

(56) References Cited

U.S. PATENT DOCUMENTS

| | | | | |
|---|---|---|---|---|
| 2008/0277055 | A1* | 11/2008 | Yang | B27N 3/08 |
| | | | | 156/272.2 |
| 2011/0027529 | A1* | 2/2011 | Zhang | B27N 3/04 |
| | | | | 144/333 |
| 2011/0293880 | A1* | 12/2011 | Yu | B27J 1/003 |
| | | | | 144/333 |
| 2013/0131223 | A1* | 5/2013 | Bouguettaya | C09J 139/02 |
| | | | | 264/331.21 |
| 2013/0131230 | A1* | 5/2013 | Bouguettaya | C08L 97/02 |
| | | | | 524/72 |
| 2013/0131231 | A1* | 5/2013 | Bouguettaya | C08L 97/02 |
| | | | | 524/72 |
| 2014/0142224 | A1* | 5/2014 | Bouguettaya | D21J 3/12 |
| | | | | 524/43 |
| 2015/0258760 | A1* | 9/2015 | Renneckar | B32B 7/04 |
| | | | | 156/309.9 |
| 2017/0114541 | A1* | 4/2017 | Hebel | E04C 5/168 |
| 2018/0243938 | A1* | 8/2018 | Badoux | B27N 3/002 |
| 2019/0160793 | A1* | 5/2019 | Chan | B27N 3/00 |
| 2020/0071530 | A1* | 3/2020 | Birkeland | C08L 97/02 |
| 2022/0371219 | A1* | 11/2022 | Yadama | B32B 21/13 |
| 2025/0144840 | A1* | 5/2025 | Tam | B27M 1/02 |
| 2025/0144841 | A1* | 5/2025 | Tam | B27G 11/00 |

FOREIGN PATENT DOCUMENTS

| | | | |
|---|---|---|---|
| CN | 104608210 B | * | 5/2017 |
| CN | 107234696 A | * | 10/2017 |
| CN | 108032405 A | * | 5/2018 |
| CN | 108437132 A | * | 8/2018 |
| WO | WO 2009-045009 A | * | 5/2009 |
| WO | WO 2009-056009 A | * | 5/2009 |

OTHER PUBLICATIONS

Screen captures and transcript from YouTube video clip entitled "How Used Chopsticks Are Turned into Tables, Tiles, and Other Furniture", (https://www.youtube.com/watch?v=pLL4PW4LZT8) uploaded by user "Business Insider" on Feb. 26, 2021. (Year: 2021).*

Nkeuwa, W.N et al. "Bamboo-based composites: A review on fundamentals and processes of bamboo bonding" Composites Part B: Engineering, vol. 235, 109776, Apr. 15, 2022. (Year: 2022).*

Furniture made from recycled bamboo chopsticks, formaldehyde-free resins, and the growing conversation around sustainable material sourcing. (https://insights.basf.com/home/article/read/from-dinner-tables-to-tabletop-tiles-the-full-circle-journey-of-recycled-bamboo-chopsticks) Mar. 14, 2018. (Year: 2018).*

BASF - ACRODUR 950 L (Feb. 2018) (Year: 2018).*

Sylvayanti, S.P.; Nugroho, N.; and Bahtiar, E.T. "Bamboo Scrimber's Physical and Mechanical Properties in Comparison to Four Structural Timber Species". Forests (Jan. 2023) 14, 146. (https://doi.org/10.3390/f14010146) (Year: 2023).*

Huang, Y.; Ji, Y.; and Yu, W. "Development of bamboo scrimber: a literature review". Journal of Wood Science (2019) 65, 25. (https://doi.org/10.1186/s10086-019-1806-4) (Year: 2019).* https://chopvalue.ca/materials/ via wayback machine http://web.archive.org/web/20180811203556/https://chopvalue.ca/materials/ (2018).

* cited by examiner

METHODS FOR REPURPOSING USED CHOPSTICKS AND ARTICLES MADE FROM THE SAME

BACKGROUND OF THE INVENTION

1. Field of the Invention

Embodiments of the invention relate generally to sustainable products and methods for making the same. More particularly, embodiments of the invention relate to methods for repurposing used chopsticks and articles made from used chopsticks.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Disposable chopsticks are often used in both restaurants and for takeout food orders. These products, typically made from wood, such as bamboo, are often disposed of and become part of solid waste collection and disposal.

In view of the foregoing, there is a need for methods to repurpose used chopsticks to provide various wooden products.

SUMMARY OF THE INVENTION

Embodiments of the present invention provide a wood-based product comprising a plurality of chopsticks, stacked and pressed together to form a solid unfinished wood product, wherein one or more of the solid unfinished wood products are cut and/or assembled to form the wood-based product.

Embodiments of the present invention provide a wood-based product, comprising a plurality of chopsticks, stacked and pressed together to form a solid unfinished wood product, wherein the plurality of chopsticks are used chopsticks, sorted on a shaker table; the plurality of chopsticks are pressed at a pressure from 6 to 35 MPa to hold the plurality of chopsticks together as the unfinished wood product; the plurality of chopsticks are heated to a temperature from 65° C. to 200° C. during at least a portion of a time the plurality of chopsticks are pressed; and one or more of the solid unfinished wood products are cut and/or assembled to form the wood-based product.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
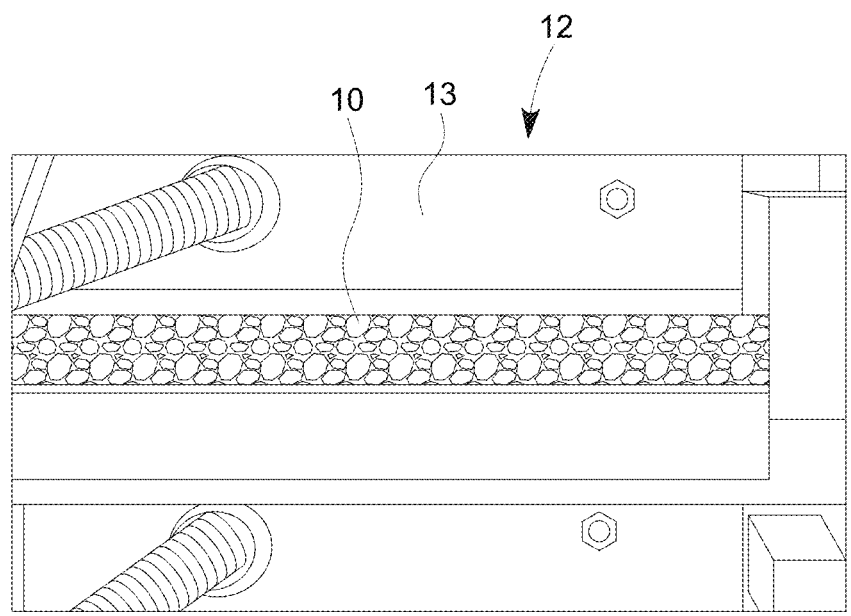
FIG. 1 illustrates a side view of a pressing machine pressing a stack of chopsticks into an unfinished wood product, according to an exemplary embodiment of the present invention.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide methods for repurposing used chopsticks to make various wooden products. The method can include sorting, pressing and finishing the product pressed product into a desired manufactured item. The method can include other steps, such as soaking, drying, polishing, and applying a finish. In some embodiments, the chopsticks, prior to pressing, may be modified by soaking, application of a finish or preservative, application of a binder, or the like. Such manufactured items can include furniture, houseware, storage products and the like.

Figure 2:
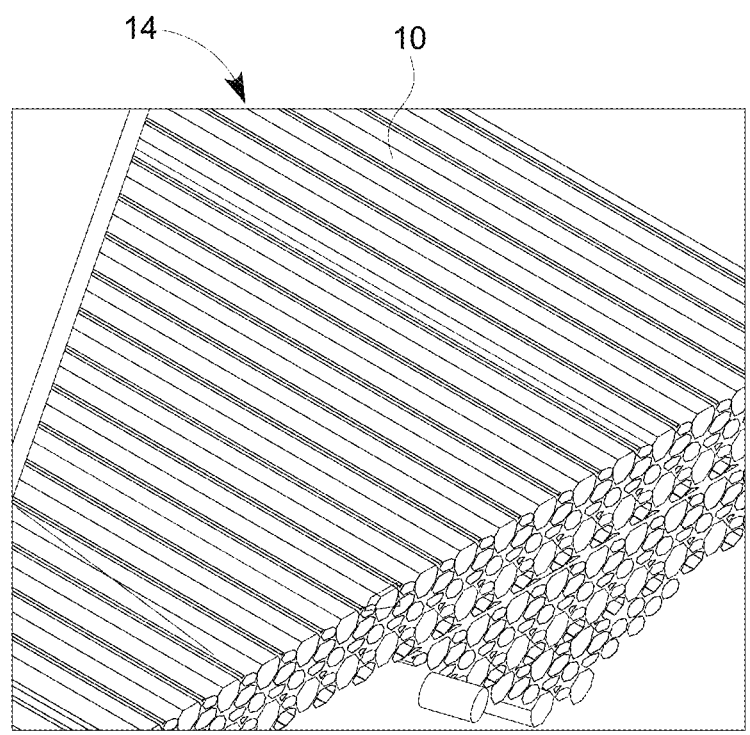
FIG. 2 illustrates a top perspective view of an unfinished wood product formed from pressing a stack of chopsticks, according to an exemplary embodiment of the present invention.

Referring to FIG. 1, a plurality of chopsticks 10 may be pressed together in a press machine 12 to join the chopstick 10 together into an unfinished product 14, as shown in FIG. 2. The press machine 12 may provide pressures from 6 to 35 megapascal (MPa) for a time from about 3 minutes to about 30 minutes, typically from 5 minutes to 20 minutes, in order to hold the chopsticks 10 together in the unfinished product 14. Typically, the chopsticks 10 will be aligned to run substantially parallel to each other, with their ends generally aligned. For example, each end of the stacked chopsticks can be aligned to provide the ends of the stacked chopsticks in a plane generally parallel to a direction of force applied by the press machine. As used herein the term "substantially parallel" refers to generally parallel with allowed variations due to, for example, cut angles of chopsticks, which can generally be from zero to 10 degrees away from true parallel. As used herein, ends are "generally aligned" when the ends on at least one end of the aligned chopsticks are flush with each other, with a variation of less than about 0.5 inch, typically less than about 0.25 inch.

The unfinished product 14 can be formed into a finished wood product 16 through various techniques, such as end cutting to remove the ends of the chopsticks that do not align, and planing to smooth and flatten the top and bottom surfaces and jointing to square the edges. Such a finished wood product 16 may be designed, for example, in a 7 inch by 7 inch square, or a 7 inch by any length rectangle. The length limit of about 7 inches is due to the length of a typical chopstick.

Figure 4:
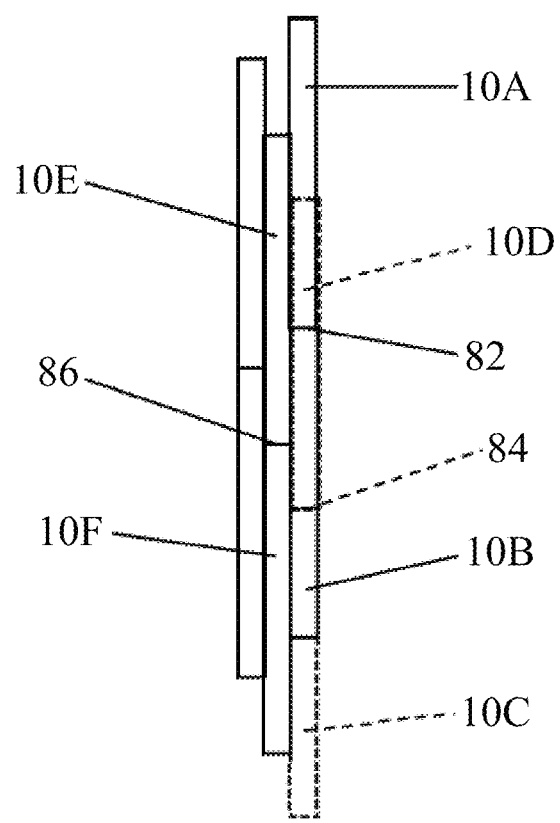
FIG. 4 illustrates an end-to-end alignment of chopsticks to form a larger unfinished wood product, according to an exemplary embodiment of the present invention.

In some embodiments, the chopsticks 10 may be disposed substantially parallel with each other, but their longitudinal positions relative to each other may not align. A single layer 20 of such chopsticks that are not longitudinally aligned is shown in FIG. 4. When such layers 20 are stacked and pressed, the resulting unfinished product may be longer than the length limit of about 7 inches. The chopsticks 10 may be randomly aligned or may be laid end-to-end, as shown in FIG. 4, to form a larger sized unfinished product. It should be noted that FIG. 4 illustrates only a single layer of such end-to-end chopsticks (with one additional partial layer shown by dotted lines), where multiple layers may be used to form a stack to be pressed. Typically, the end-to-end boundary of one layer of the multiple layers does not align with the adjacent upper or lower layer, as illustrated by dashed lines in FIG. 4. In other words, the stacked chopsticks 80 include chopsticks 10A, 10B laid longitudinally end-to-end at an end-to-end junction 82, wherein the end-to-end junction 82 of a set of two chopsticks in one layer (chopsticks 10A, 10B) of the stacked chopsticks is offset from the end-to-end junction 84, 86 of a second set of two chopsticks in an adjacent layer (chopsticks 10C, 10D) and/or adjacent row (chopsticks 10E, 10F) of the stacked chopsticks 80. When forming larger products, a larger pressing machine may be required. In some embodiments, an entire larger product may be pressed in one action, or, where even larger sizes are needed (larger than the size of the press machine), one portion of the loose chopsticks may be pressed at a time, overlapping as the entire product is pressed. In some embodiments, smaller panels may be formed and joined together by one or more wood joining techniques, such as gluing, biscuit joining, doweling, dovetail, tongue-and-groove, or the like.

Figure 5:
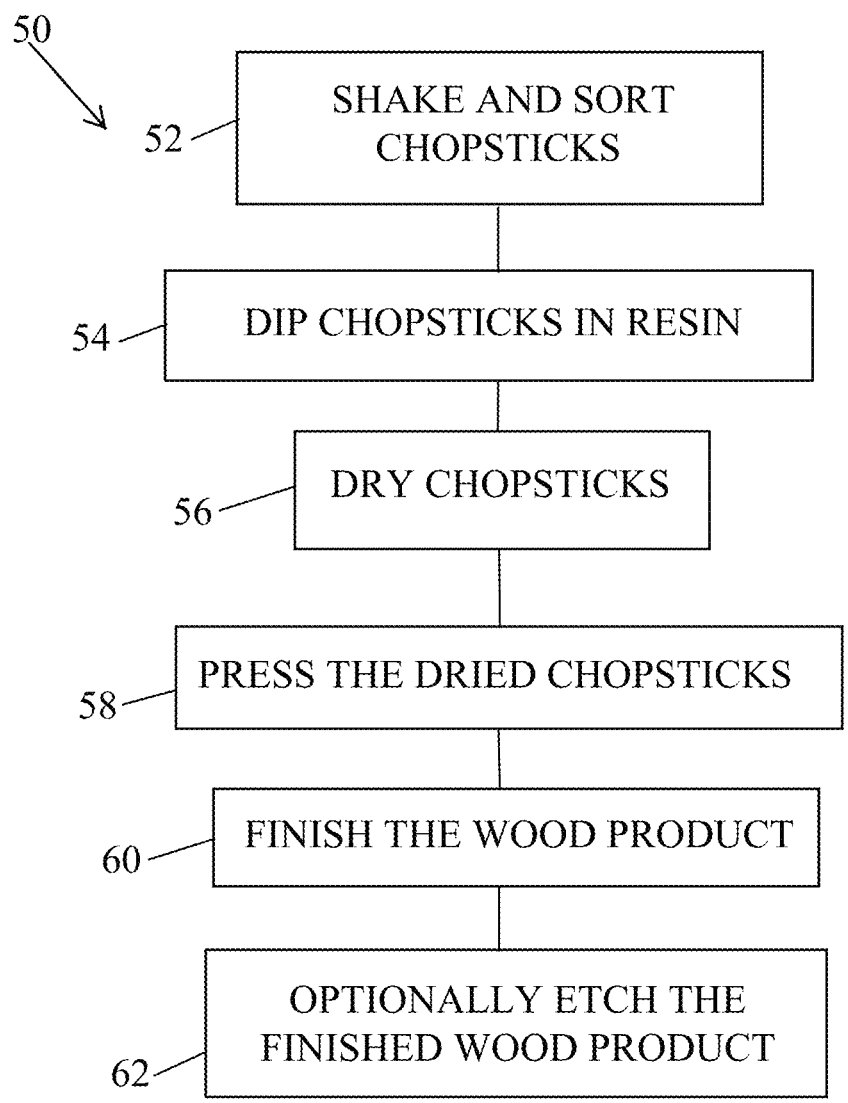
FIG. 5 illustrates a process of making the finished wood product of FIG. 3, according to an exemplary embodiment of the present invention.

Referring to FIG. 5, a process 50 is shown for preparing a finished wood product, according to an exemplary embodiment of the present invention. The loose chopsticks may stacked and sorted in step 52 on, for example, a shaker table. For example, if making product that is only the length of a single chopstick (and virtually any width), the chopsticks, in step 52 may be stacked and aligned in individual containers, such as steel, rectangular containers. In some embodiments, the shaking, stacking and sorting may be performed by multiple machines or a single machine.

Next, the chopsticks may be dipped in a resin, such as a water-based resin, such as an epoxy resin, an alkyd resin, a polyester resin, a polyurethane resin, an acrylic resin, or the like.

Next, the loose chopsticks may be dried in a drying machine in step 56 to reach an optimal dryness for pressing. Typically, the chopsticks can be dried to a moisture content of less than 6%, typically less than 4%. By drying the chopsticks prior to pressing, shrinkage due to during of the product after pressing (which may cause the sticks to later separate) can be avoided. The drying process can hold the tiles together in a rough tile shape. In some embodiments, a finish or preservative may be applied at this stage. For example, a wood stain may be applied to the loose chopsticks to provide a finish to the chopsticks prior to pressing. In some embodiments, different chopsticks may be provided with different colors of wood stain to provide a "striped" style of finished wood product. In some embodiments, a food safe oil, such as linseed oil, may be applied to the chopsticks prior to pressing to help preserve the wood and help prevent moisture absorption, which may be useful for products such as cutting boards, coasters, or the like. Of course, such finishes may be applied to the finished wood product in addition to, or instead of, a finish applied to the loose chopsticks. Further, it should be noted that the drying step may be performed before the stacking and aligning or the chopsticks, where the chopsticks may be cleaned, dried and then stacked and aligned.

Next, at step 58, the chopsticks may be pressed. In some embodiments, where the chopsticks are stacked and aligned in containers, such as steel boxes, the head 13 of the press machine 12 (see FIG. 1) may fit into the container in a close arrangement, such as with less than ⅛ inch clearance on each side of the head 13 inside the container. The chopsticks may be pressed at an elevated temperature of from about 65° C. to about 200° C., for example. As described above, the press machine 12 may provide pressures from 6 MPa to 35 MPa for a time from about 3 minutes to about 30 minutes, typically from 5 minutes to 20 minutes, in order to hold the chopsticks 10 together in the unfinished product 14. The elevated temperatures may help ensure the chopsticks and the unfinished product 14 are cleared of any potentially dangerous bacterial contamination.

The resulting pressed unfinished product may be finished, at step 60, through various finishing machines, such as saws, planers, jointers, routers or the like. The finished product may then have a surface coating applied thereto, such as stain, oil, epoxy, or the like, depending on the desired look and utility. Further, a laser engraving machine may be used to provide other finish designs on the surface of the product at step 62.

In some embodiments, the chopsticks may adhere together without any adhesive. In other embodiments, prior to pressing the loose chopsticks together, an adhesive may be used to provide additional adhesion of the chopsticks in the finished product. The adhesive may be, for example, spray applied to loose chopsticks, for example. The adhesive may be a water proof adhesive when the final product is to be used in wet locations. The adhesive may be food safe when the final product is to be used in contact with food, for example. In some embodiments, the adhesive may be a plant based adhesive, such as a corn starch or flour adhesive.

Figure 3:
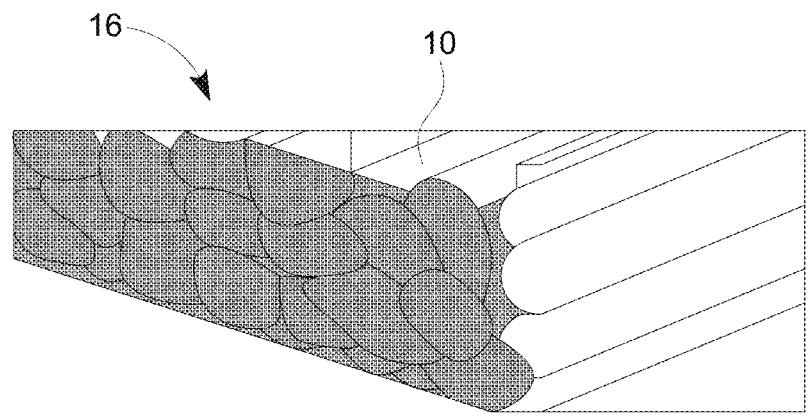
FIG. 3 illustrates an end perspective view of a finished wood product formed from finishing the unfinished wood product of FIG. 2.

In some embodiments, products may be formed by forming tiles that are about 7 inches wide (the length of the chopsticks) by any length. Typically, the tiles can be made from about ¾ inch to about 2 inches thick, by stacking and pressing 3-20 (or more) layers of chopsticks. In these embodiments, the top and bottom faces of the tiles are formed from the longitudinal lengths of the chopsticks. See, for example, FIGS. 2 and 3. However, in other embodiments, the product may be made where the top and bottom surfaces are formed from the ends of the chopsticks. For example, the cutting board 70 of FIG. 7, where the chopstick detail is shown only for a portion of the product.

Figure 6:
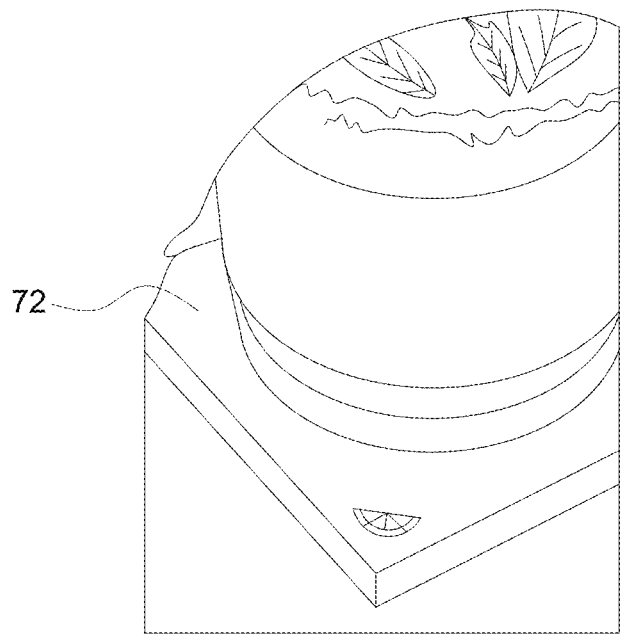
FIG. 6 illustrates a coaster formed from the finished wood product of FIG. 2.
Figure 7:
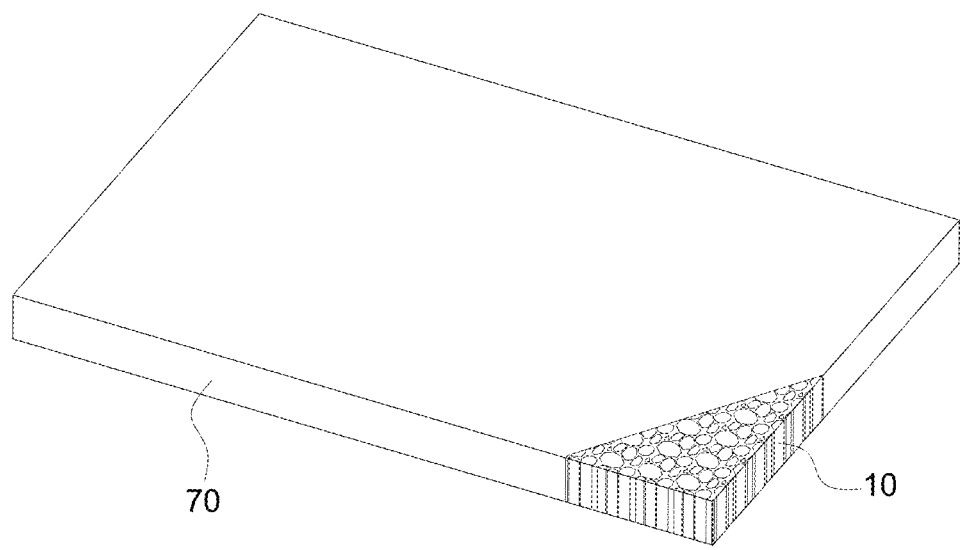
FIG. 7 illustrates a cutting board formed from stacked, pressed chopsticks.
Figure 8:
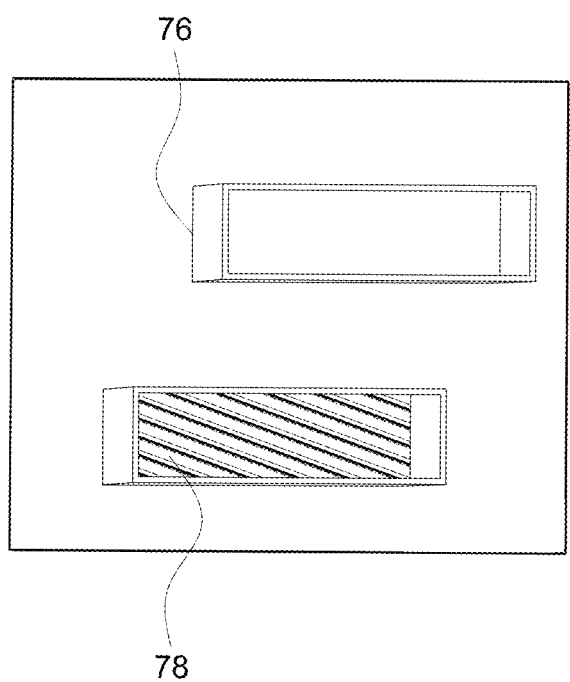
FIG. 8 illustrates wall shelving formed from stacked, pressed chopsticks, where an upper shelving unit has an open back and the lower shelving unit has a backing formed from pressed chopsticks.

As shown in FIGS. 6 through 8, various products may be made with the chopstick wood products. In FIG. 6, a coaster 72 may be designed. In FIG. 7, a cutting board 70 may be formed. In FIG. 8, a shelving unit 76 may be formed, where the shelving unit 76 can include an open back (the upper shelving unit) or can include a backing 78 that can also be made of pressed chopsticks. Of course, practically any product that may be formed from wood may be designed with the chopstick based wood product formed according to embodiments of the present invention. As discussed above, the chopsticks may be aligned in various alignments, such as longitudinally with the top and bottom planes (where the top and bottom surfaces are the largest, opposite surfaces of the wood product), or longitudinally perpendicular to the top and bottom planes. In some embodiments, other angles may be used to align the chopsticks in the pressed chopstick wood product.

In some embodiments, tiles may be formed and then used to make larger wood surfaces, including storage solutions, furniture, shelving or the like. The tiles may be glued together edgewise to form the larger surfaces. Such gluing may include other joining techniques such as dowels, biscuits, or the like. The finished products may be sanded, stained, varnished, or the like. In some embodiments, as discussed above, the individual chopsticks may be treated (such as stained) before pressing, where a finish may not be needed on the finished product.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A wood-based product comprising:
a plurality of chopsticks, having a moisture content less than 4 percent, pressed together to form a solid unfinished wood product, wherein
one or more of the solid unfinished wood products are cut and/or assembled to form the wood-based product; and
the plurality of chopsticks are free from adhesive.

2. The wood-based product of claim 1, wherein the chopsticks are previously used chopsticks that are stacked in a shaker table before being pressed together.

3. The wood-based product of claim 2, wherein the stacked chopsticks include chopsticks laid longitudinally end-to-end at an end-to-end junction, wherein the end-to-end junction of a set of two chopsticks in one layer of the stacked chopsticks is offset from the end-to-end junction of a second set of two chopsticks in an adjacent layer and/or an adjacent row of the stacked chopsticks.

4. The wood-based product of claim 1, wherein the plurality of chopsticks are heated and then pressed, wherein the pressing creates from 6 MPa to 35 MPa of force onto the stacked chopsticks and the heating is at a temperature from 65° C. to 200° C.

5. The wood-based product of claim 4, wherein the heat and pressure is applied to the pressed chopsticks from 5 to 20 minutes.

6. The wood-based product of claim 1, further comprising a treatment applied to the plurality of chopsticks prior to being pressed.

7. The wood-based product of claim 6, wherein the treatment includes a stain or an oil.

8. The wood-based product of claim 1, wherein the plurality of chopsticks are each aligned at an end thereof to provide the ends of the plurality of chopsticks in a plane.

9. The wood-based product of claim 1, wherein the solid unfinished wood product has a rectangular shape with a width approximately a length of the plurality of chopsticks.

10. The wood-based product of claim 9, wherein the wood-based product is formed from a plurality of the solid unfinished wood products joined together.

11. The wood-based product of claim 1, wherein the solid unfinished wood product includes planar and opposing top and bottom surfaces, wherein the plurality of chopsticks are aligned longitudinally parallel with the top and bottom surfaces.

12. The wood-based product of claim 1, wherein the solid unfinished wood product includes planar and opposing top and bottom surfaces, wherein the plurality of chopsticks are aligned longitudinally perpendicular to the top and bottom surfaces.

* * * * *